(12) United States Patent
Kuwamoto et al.

(10) Patent No.: US 7,958,445 B1
(45) Date of Patent: Jun. 7, 2011

(54) SYSTEM AND METHOD FOR STORING DATA ASSOCIATED WITH A FILE

(75) Inventors: Sho Kuwamoto, San Francisco, CA (US); Heidi Bauer, San Francisco, CA (US); Kenneth P. Sundermeyer, Belmont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 125 days.

(21) Appl. No.: 12/403,269

(22) Filed: Mar. 12, 2009

Related U.S. Application Data

(63) Continuation of application No. 09/991,766, filed on Nov. 23, 2001, now Pat. No. 7,526,720.

(60) Provisional application No. 60/252,532, filed on Nov. 22, 2000, provisional application No. 60/254,307, filed on Dec. 8, 2000.

(51) Int. Cl.
*G06F 17/00* (2006.01)

(52) U.S. Cl. .................................. 715/237; 715/205

(58) Field of Classification Search ................ 715/205, 715/234, 237, 248, 249, 250
See application file for complete search history.

(56) References Cited

U.S. PATENT DOCUMENTS

| | | | |
|---|---|---|---|
| 5,481,701 A * | 1/1996 | Chambers, IV | 1/1 |
| 5,664,186 A * | 9/1997 | Bennett et al. | 1/1 |
| 5,864,865 A * | 1/1999 | Lakis | 1/1 |
| 5,911,776 A | 6/1999 | Guck | |
| 6,356,920 B1 | 3/2002 | Vandersluis | |
| 6,374,268 B1 * | 4/2002 | Testardi | 707/822 |
| 6,411,970 B1 * | 6/2002 | Aitken et al. | 1/1 |
| 6,510,466 B1 | 1/2003 | Cox et al. | |
| 6,594,692 B1 * | 7/2003 | Reisman | 709/219 |
| 6,625,619 B1 * | 9/2003 | McClendon et al. | 1/1 |
| 6,748,569 B1 | 6/2004 | Brooke et al. | |
| 6,760,043 B2 | 7/2004 | Markel | |
| 7,526,720 B1 | 4/2009 | Kuwamoto et al. | |
| 2001/0037490 A1 | 11/2001 | Chiang | |
| 2002/0049702 A1 | 4/2002 | Aizikowitz et al. | |
| 2002/0059278 A1 | 5/2002 | Bailey et al. | |
| 2002/0135538 A1 | 9/2002 | Rosen | |

OTHER PUBLICATIONS

Dourish, Paul, et al., "Extending Document Management Systems with User-Specific Active Properties", ACM Transactions on Information Systems (TOIS), vol. 18, Issue 2, Apr. 2000, pp. 140-170.

U.S. Provisional Application, Chiang, Hiang-Swee, filed Mar. 17, 2000.

U.S. Provisional Application, Olenick, Michael, et al., filed May 1, 2000.

Vitali, Fabio, et al., "Hypermedia on the Web: What Will It Take?", ACM Computing Surveys (CSUR), Dec. 1999, pp. 1-6.

Microsoft Computer Dictionary, Third Edition, Microsoft Corporation, 1997, pp. 430.

(Continued)

*Primary Examiner* — Laurie Ries

(74) *Attorney, Agent, or Firm* — Fish & Richardson P.C.

(57) ABSTRACT

A system and method stores keys and values defined for a file as XML tags and values in a separate shadow file, allowing the keys and values to remain separate from the file, while being associated with the file so that the shadow file can be viewed, moved, stored or retrieved in tandem with the file.

21 Claims, 4 Drawing Sheets

OTHER PUBLICATIONS

Lecluse, Christphe, "A Generalized Online Delivery Paradigm for XML Information", GCA Conferences, XML, '98, Chicago, Dec. 1998, downloaded from http://www.infoloom.com/gcaconfs/WEB/TOC/gcacotoc.HTM., pp. i-iv and 1-10.

Carlson, et al., "Real World Adobe GoLive 4", Peachpit press, 2000, ISBN 0-201-35474-8.

Towers, "Dreamweaver for Windows and MacIntosh". Peachpit press, 2000 ISBN 0-201-70240-1.

\* cited by examiner

SYSTEM AND METHOD FOR STORING DATA ASSOCIATED WITH A FILE

CROSS REFERENCE TO RELATED APPLICATIONS

This application is a continuation of and claims the benefit of U.S. patent application Ser. No. 09/991,766, entitled "System and Method for Storing Data Associated with a File," filed Nov. 23, 2001, which claims the benefit of the priority of U.S. Provisional Application No. 60/252,532, entitled "Method and Apparatus for Storing Data Related to a File," filed on Nov. 22, 2000, and of U.S. Provisional Application No. 60/254,307 entitled, "Method and Apparatus for Storing Data Related to a File" filed on Dec. 8, 2000, and each is hereby incorporated herein by reference in its entirety.

FIELD OF THE INVENTION

The present invention is related to computer software and more specifically to computer software for storing information.

BACKGROUND OF THE INVENTION

Computers are frequently used to store information. If information stored in a file on a computer contains code for a web page, the information in the file can be used to render the page when the file is provided by a server to a browser.

It can be helpful to store information about the file or information related to the file. For example, notes about editing the file, comments and other information may be desirable to store. One way of storing information about a file is to store the information in the file itself. For example, a designer could store notes about the file as an HTML comment by surrounding the comment with the characters, "<!--" before the comment and the character, "-->" after the comment.

If a file contains the source code for a web page, however, storing information about the file or other information as a comment in the file itself may be undesirable for several reasons. One reason has to do with the fact that when a user requests a web page from a server, the source code for the web page is provided by the server to the user's computer system, stored on the user's computer system, and rendered by a browser. Although comments are not rendered by the browser, they are accessible to the user (for example, by clicking on the command "view-source" in the conventional Internet Explorer product commercially available from Microsoft Corporation of Redmond, Wash.), and the designer of the web page may not wish the user to be able to view the information about the web page stored as a comment. Another reason it may be undesirable to store information about a web page in the source code for the page is that the information will be downloaded as part of the page, increasing the time required to download the page, and driving up costs of serving the web page to users due to increased bandwidth and traffic requirements of the page.

What is needed is a method and system for storing information about a file that does not store the information in the file.

SUMMARY OF INVENTION

A system and method allows a user of a file such as the author of the file to enter values for predefined keys, define new keys and add values to those keys, or both. The keys and values may describe attributes of the file, information about the file, or information unrelated to the file. The system and method stores the keys and values as XML tags and attributes in a separate "shadow" file, having the same name but an additional extension as the file to which it corresponds, and in a subfolder of the folder in which the file is stored. If the file is moved or renamed, the system and method moves or renames the shadow file consistently with the rules described above. The system and method may upload or download to a server the shadow file when the file is uploaded or downloaded. When the system and method reads the file, it can also automatically read the shadow file, allowing the user causing the system and method to read the file to view the keys and values, modify or delete any keys and values, and store the new keys and values in the shadow file when the file is stored.

DETAILED DESCRIPTION OF A PREFERRED EMBODIMENT

Figure 1:
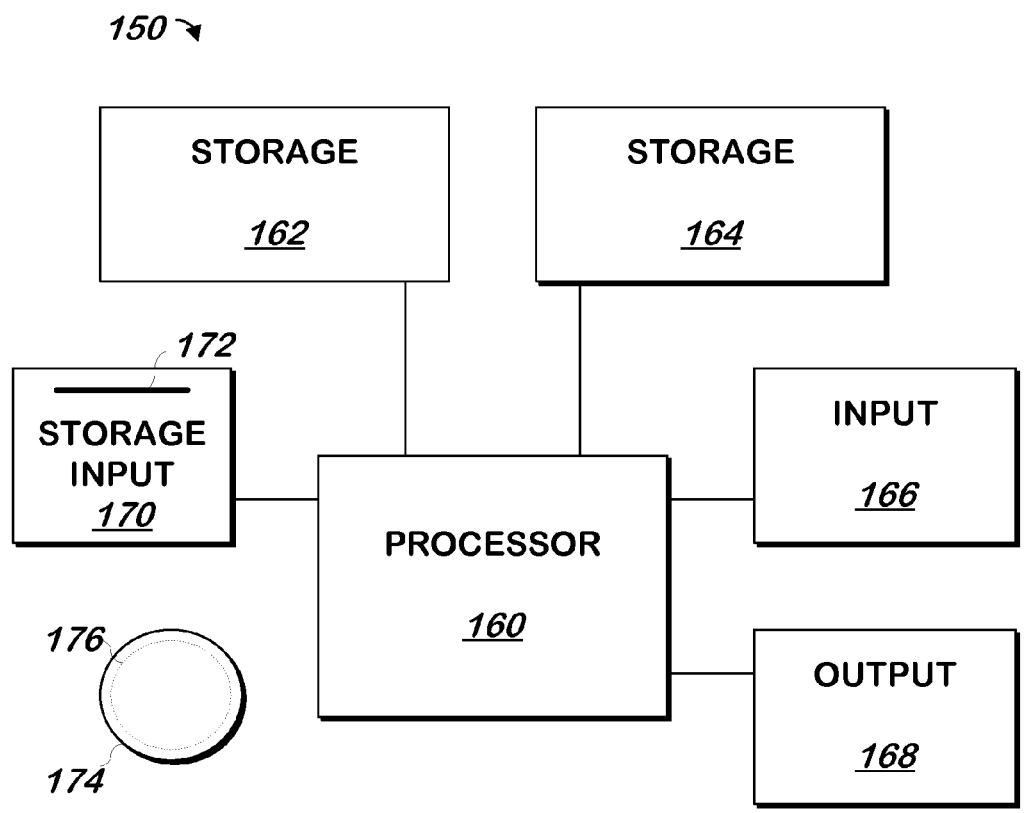
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer-term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running the Windows (95, 98 ME, 2000 or NT) operating system including the conventional Internet Explorer Browser commercially available from Microsoft Corporation of Redmond Wash. or a Macintosh computer system running the MacOS commercially available from Apple Computer Corporation of Cupertino, Calif. and the Netscape browser commercially available from Netscape Computer Corporation of Mountain View, Calif. although other systems may be used.

Figure 2:
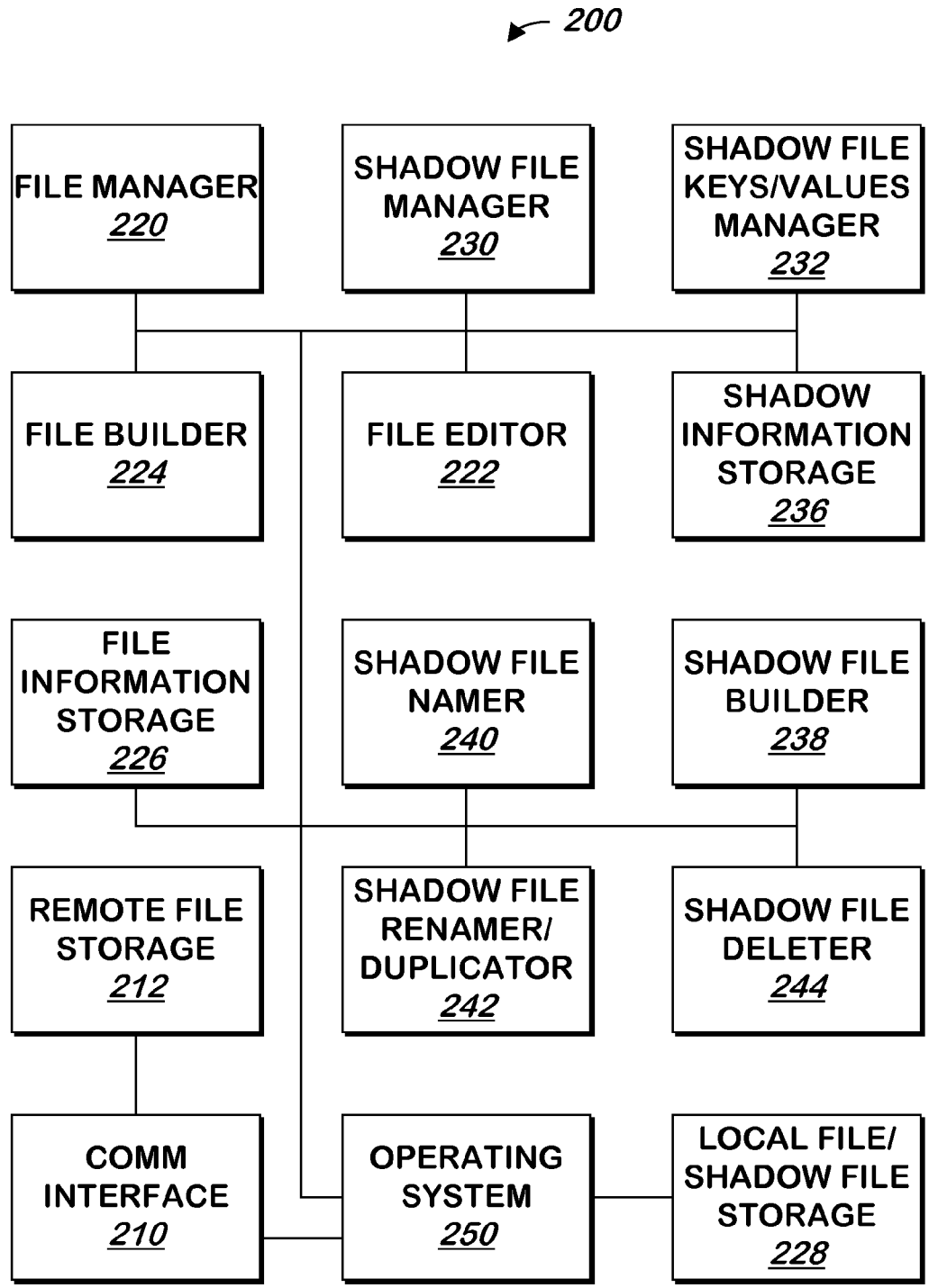
FIG. 2 is a block schematic diagram of a system for associating information with a file according to one embodiment of the present invention.

Referring now to FIG. 2, a system 200 for associating information with a file is shown according to one embodiment of the present invention.

In one embodiment the system 200 may be included as part of a web authoring development application, such as the conventional Dreamweaver product commercially available from Macromedia of San Francisco, Calif., or the conventional GoLive product commercially available from Adobe, Inc., of San Jose, Calif. Dreamweaver is described in Towers, *Dreamweaver for Windows and Macintosh* (Peachpit Press 2000, ISBN 0-201-70240-1), and GoLive is described in Carlson & Fleishman, *Real World Adobe GoLive 4* (Peachpit Press 2000, ISBN 0-201-35474-8). Both of these books are hereby incorporated by reference in their entirety.

In one embodiment of the present invention, file manager 220 receives one or more commands to open or create a new file. The commands may include a file name or other identifier of the file, which file manager 220 internally stores. File manager 220 then opens from local file/shadow file storage 228, which may be any conventional disk or other storage, or creates the file and stores the file in file information storage 226, which may be conventional memory or disk storage.

The user of the system 200 may then use file editor 222 to edit the file. File editor 222 may contain a graphical editor to allow a user to edit information for the file graphically, a code editor to allow the user to edit information using a text based editor, or both so that the user can choose either editing method.

In one embodiment, the information in the file corresponds to code for a web page (including HTML code), and the graphics editor allows a user to edit the HTML code for the web page by editing graphical representations of the objects corresponding to the code and through dialog boxes and menu selections for such objects. The graphical representations of the objects are provided within a graphical user interface such that they appear similar to how the objects could be rendered by a conventional browser.

In one embodiment, edits made using one editor will cause changes to occur in the other editor that are consistent with the original edits. For example, if an image object is graphically expanded using the graphics editor by dragging a corner of an image using a mouse, file editor 222 will automatically adjust the code for the size of the image displayed by the code editor consistent with the changes made using the graphics editor. File editor 222 stores the information for the file in file information storage 226 after editing.

Although the file is described herein as containing HTML code, any type of file may be used with the present invention, including files that contain information that may be downloaded as part of a web page such as graphics or other files.

In one embodiment, if a user wishes to store information to be associated with a file, the user indicates this wish by signaling file manager 220 to enable such associations. In one embodiment, one or more files may be defined by the user via file manager 220 as being part of a website and enabling such associations for a file applies to all files for the website corresponding to the file for which the enablement is made and in another embodiment, a single file may have such associations enabled. When the associations are enabled, file manager 220 stores an indication of the enablement in file information storage 226. The user may then associate keys and values with the file, such keys and values to be stored in a shadow file as described below using a menu command sent to file manager 220. If the menu command is received, file manager 220 signals shadow file keys/values manager 232.

In one embodiment, shadow file keys/values manager 232 provides a user interface to allow the user to define the information to be associated with the file. In one embodiment, the information to be associated with a file is either basic information, information for which keys are predefined and values are either selected from a list of predefined values or are user defined values, or user information, for which both the keys and values are user-defined. Either or both types of information may be associated with a file according to the present invention.

In one embodiment, the basic information and user information is made up of one or more keys, as well as a value for each key. A value contains information and a key describes the information contained in the value for the key. Thus, the key "Author" may have a value of "Tom Smith" to signify the author of the file is Tom Smith.

In one embodiment, using the user interface provided by shadow file keys/values manager 230, the user may use a set of tabbed dialog-box-sized windows to enter the values of basic information and to define keys and enter values for "user information".

The user may press a "basic info" tab to enter values for basic information having predefined keys such as "status", and "notes" used to store additional notes. All of the keys are visible and all of the values are visible and changeable through conventional text boxes or pull down lists. In one embodiment, some or all values for any key may be predefined values which the user selects from a drop down list. For example, the values for the status key may be selectable from any of "draft", "revision 1", "revision 2", "revision 3", "alpha", "beta", "final" and "needs attention".

The user may also press an "all info" tab to view and change both the basic information and the user information. If the "all info" tab is selected, shadow file keys/values manager 232 provides a user interface to display all currently defined keys and values of both basic information and user information, and to allow the keys and/or values to be added, changed and deleted. Keys and values are displayed with an equal sign between each key and its corresponding value (e.g. "author=Tom Smith") in a list of keys and values. To add a key and value pair to shadow file keys/values manager 232, the user clicks on an "add" button labeled "+" and then types the name of the key in a "name" text box and types the value in a "value" text box. The key and value added will be displayed in the list by shadow file keys/values manager 232 as described above.

To delete a key-value pair, the user identifies the key-value pair to be deleted, highlights the identified key-value pair on the list and clicks on a "delete" button labeled "−". If the pair is basic information, the value is removed, but the user may reenter it via the basic info tabbed window or the all info tabbed window. Keys for basic information for which there is no value are not displayed in the list of keys/value pairs by shadow file keys/values manager 232.

A user can modify a key/value pair by highlighting the displayed key and value. When a key-value pair is highlighted, the key and value appear in the "name" and "value" text boxes described above. A user may change the name of the key or value for the key using these text boxes provided by shadow file keys/values manager 232.

In one embodiment, shadow file keys/values manager 232 store the predefined and user-defined keys with any values for such keys in shadow information storage 236. Shadow information storage 236 may be any form of conventional storage such as memory or disk.

In one embodiment, when the user wishes to save the file, the user signals file manager 220 to save the file via a menu or other conventional methods. File manager 220 signals file builder 224 by providing a name of the file (including any path), either the name used to open the file or another name received from the user via a save-as dialog box. File builder 224 retrieves the file information from file information storage 226 and builds this information into one or more files using a proprietary format, an HTML file that may be served as a web page to a requester of the file, or both. Via operating system 250, file builder 224 stores such file or files in local file/shadow file storage 228, which may be any form of conventional storage such as memory or disk and need not be local to a computer system on which the system 200 is operating.

In one embodiment, when file manager 220 signals file builder 224, file manager 220 also signals shadow file namer 240 by providing the name of the file it has provided to file builder 224. In another embodiment, file manager 220 signals shadow file namer 240 at some later time, such as when file builder 224 has completed building and storing the file or files as described above.

In one embodiment, using the file name received from file manager 220, shadow file namer 240 builds a path and a file name for the shadow file. To build the path for the shadow file, shadow file namer 240 alters the path of the file to include a notes subdirectory of the directory in which the file is stored. For instance, if a shadow file is created for an image in an image directory, the notes subdirectory is located within the image directory, even if the image is viewed within a document located in a root directory, for instance, a site root folder. In an alternate embodiment, shadow file namer 240 creates a path to a central folder in which all shadow files for documents and images within the defined directory are located, for instance, all the shadow files created for a particular web site.

Shadow file namer 240 names the shadow file by adding an extension, such as ".mno", to the right of the filename, including any extension. For example, a shadow file corresponding to a file named innovation.html is named innovation.html.mno. Any other manner of designing the shadow file name may be used such that the shadow file may be identified from either a characteristic of the file or the contents of the file (e.g. by saving the name of the shadow file in the file). Shadow file namer 240 sends the shadow file name to shadow file builder 238.

In one embodiment, shadow file builder 238 retrieves the shadow file information from shadow information storage 236 and builds the shadow file using this information. In one embodiment, the shadow file format is a text file that uses conventional XML tags and values corresponding to the shadow file keys and values stored in shadow file information storage 236. For example, if a key is "Author" and a corresponding value is "Tom Smith", shadow file builder 238 builds a line in the file that reads:

"<infoitem key="author" value="Tom Smith"/>", although other forms of storing keys and values such as <author>Tom Smith</author> may be used.

Shadow file builder 238 performs this function for each key and value stored in shadow information storage to build the shadow file. Shadow file builder 238 stores the shadow file in local file/shadow file storage 228 via operating system 250.

In one embodiment, shadow file builder 238 adds additional tags to the shadow file in addition to the tags containing attributes corresponding to the keys and values. Such information may include a declaration including the version of XML in use, the character set, and may include tags to identify one or more elements of the document, between which the tags containing the attributes corresponding to any keys and values are provided. For example, in one embodiment, to provide the tag shown above in the file, shadow file builder 238 builds the file to contain the following:
<?xml version="1.0" encoding="utf-8" ?>
<info>
<infoitem key="author" value="Tom Smith"/>
</info>

In one embodiment, if a user renames or copies the file by instructing file manager 220 of such operation and by providing a new file name and/or path, file manager 220 either renames the file with the new file name via operating system 250 or copies the file by first opening the file into file information storage 226 and then saving the file using the new path, as described above. File manager 220 provides the old and new names (including paths) of the file to shadow file namer 240, which identifies the corresponding names of shadow files as described above and returns them to file manager 220. File manager 220 receives the names and passes them to shadow file renamer duplicator 242 along with an indication of the action it performed or will perform on the file. In such an embodiment, if a shadow file is stored as described above shadow file renamer/duplicator 242 renames via operating system 250 the shadow file or copies the shadow file using conventional techniques. In another embodiment, the shadow file is located in a central directory containing all shadow files.

In one embodiment, a user may delete the file using file manager 220. In such an embodiment, file manager 220 deletes the file via operating system 250 and may also pass the name (including the path) of the deleted file to shadow file deleter 244, which attempts to delete the shadow file via operating system 250 using the file name of the file to identify the name (including the path) of the shadow file as described above. The user may also manually delete shadow files using file manager 220. In one embodiment, the user clicks on a "clean up" command icon provided by the user interface provided by file manager 220 to signal shadow file deleter 244. Shadow file deleter 244 searches all files within the directory for shadow files having a name that does not correspond to any file within the corresponding file directory, prompts the user to verify that any such shadow file should be deleted, and deletes any such shadow file via operating system 250.

In one embodiment, to delete all shadow files within the defined directory whether or not the corresponding files have been deleted, the user clicks off as "enable shadow files" checkbox or other indicator provided by the user interface provided by file manager 230. File manager 230 signals shadow file deleter 244 with the name of the file to delete all shadow files within the directory corresponding to the file open when the checkbox is checked off via operating system 250 and stores the "disabled" status in file information storage 226.

In one embodiment, when file manager 220 opens the file as described above, it attempts to locate the shadow file using the name and path of the file as described above. If such a file is located, file manager 220 may open the file or may signal the user that such a shadow file for the file is available so that the user may then manually open the shadow file via file manager 220. To open the shadow file, file manager 220 signals shadow file manager 230 with the filename of the file, which opens the shadow file into shadow information storage 236 and displays the file as described above.

In one embodiment, whether to open the shadow file when the file is opened is user selectable for the file using a checkbox on the "basic info" tabbed window described above. If the box is changed from its initial value of "no" to a value of "yes" or back again, shadow file keys/values manager 232 stores the selection as a tag and attribute in shadow information storage 236. When the file is opened into file information storage 226, file manager 220 signals shadow file manager 230 to open the shadow file into shadow information storage 236 and locate the tag and attribute corresponding to the selection described above. If the tag and attribute indicate that the shadow file is to be opened, shadow file manager 230 signals shadow file keys/values manager 232 to display the basic info and window and provide via these tabs access to the all info window as described above. If the tag and attribute indicate that the shadow file is not to be opened, shadow file manager 230 closes the shadow file until the user requests the information from it, at which time shadow file manager 230 reads the shadow file and signals shadow file keys/values manager 232 to display the basic info and window and provide via these tabs access to the all info window as described above.

In one embodiment, a user may signal to file manager 220 to upload or download the file, or a file corresponding to the file, such as an HTML file produced using the file, to a server or other device remote from the system. In such embodiment, file manager 220 checks for the presence of a shadow file corresponding to the file or file corresponding to the file being uploaded or downloaded. If the shadow file exists, file manager uploads or downloads the file and/or file corresponding to the file, and the shadow file, via operating system 250 and communication interface 210, which is any conventional communication interface such as a conventional TCP/IP-compatible communication interface, to or from remote file storage 212, which may be any form of conventional storage such as memory or disk on a remote storage device, for instance, a conventional server such as a conventional web server.

In one embodiment, the user can select whether to include the shadow file with an upload or download using a user interface provided by file manager 220. A general selection may apply to all shadow files corresponding to any file uploaded that is defined as being part of a website using file manager 220. In one embodiment, the user can specifically select for each individual shadow file whether the shadow file should be included in uploads and downloads of the corresponding file, for instance, by specifying this action to file manager 220. In one embodiment, file manager 220 provides this information to file builder 224 which reads a registry file from local file/shadow file storage 228 and adds the information to the registry file and stores it into local file/shadow file storage 228. In another embodiment, file manager 220 stores the user's selection in file information storage 226 so that it will be stored with the file in the proprietary format. If the user has made both general and specific selections, shadow file manager 230 stores the specific selection.

The user may then command file manager to upload or download the file. Before the file is uploaded or after the file is downloaded, file manager 230 opens the file or registry file into file information storage 226 and investigates the field containing the indication of whether to upload or download the shadow file. If the indication was to upload and download the shadow file with the file, file manager 220 signals shadow file namer 240 with the name of the source and destination files. Shadow file namer 240 identifies the name (including the path) of the source and destination shadow files using the same techniques above and returns them to file manager 220 which uploads or downloads the shadow file using the source and destination names. If the user makes no selection, the shadow file will not be uploaded or downloaded with the file.

In one embodiment, the keys in the shadow file corresponding to each file defined as part of a single website are synchronized by the present invention to allow all keys to be the same for each file in the website. If a key is added or deleted as described above for one shadow file, the keys for all shadow files in the same directory are updated as well by shadow file keys/values manager 232.

In any of the operations performed by or involving file manager 220 for the file and shadow file described above, if the shadow file does not exist, the operation is performed on the file. It was noted above that the file might be either or both of two files, a file in a proprietary format or a file capable of being served to a user to be rendered by a browser or any other file.

In one embodiment, all input and output between the system 200 and the user is performed by operating system 250, which may be the conventional Windows operating system or the conventional Macintosh operating system, commercially available from Apple Computer Corporation of Cupertino, Calif., via input/output 252 coupled to a keyboard/mouse/monitor combination or any other input, output or input/output device.

Figure 3A:
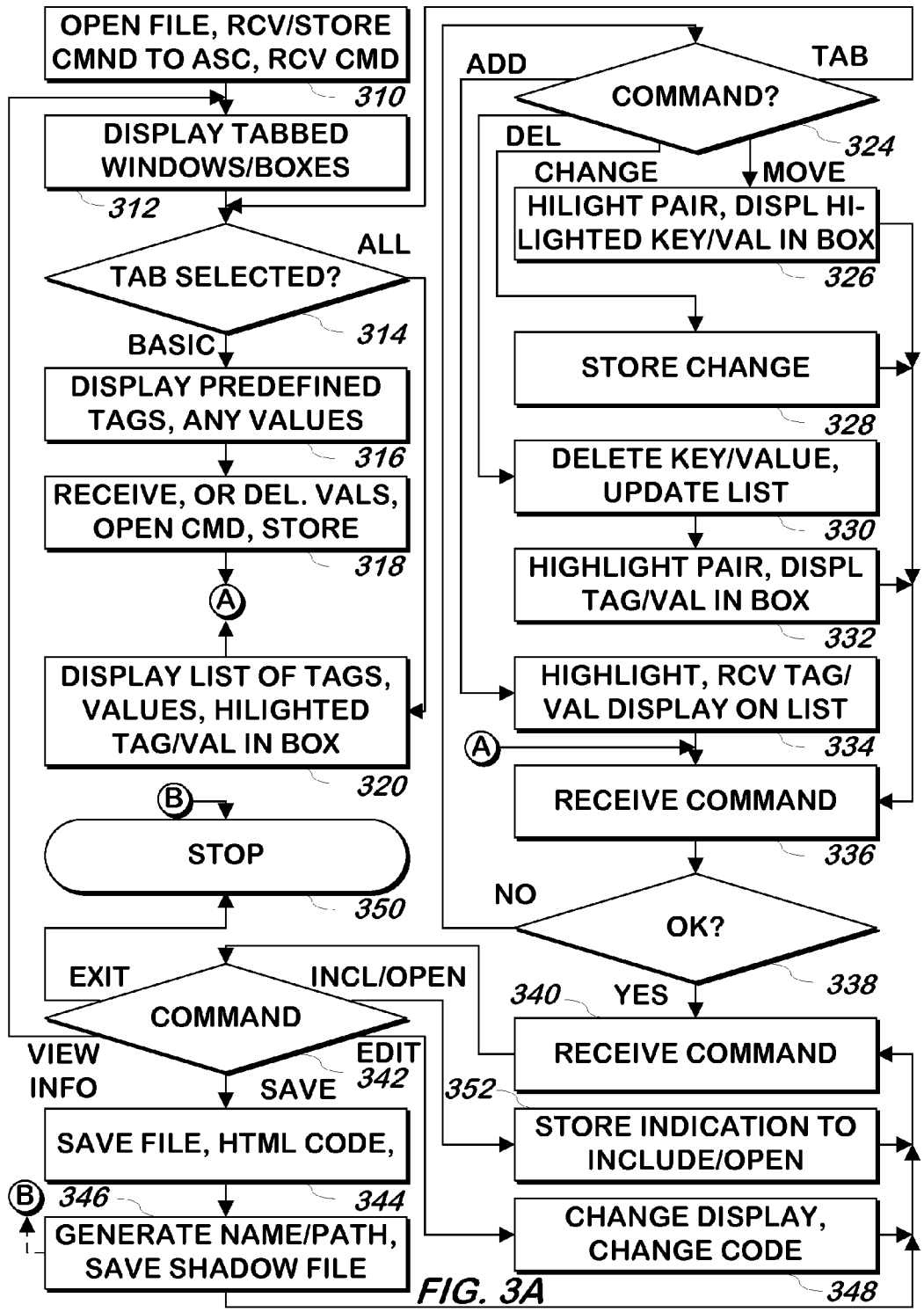
FIG. 3A is a flow chart illustrating a method for associating information with a file according to one embodiment of the present invention.

Referring now to FIG. 3A, a method for associating information with a file is shown according to one embodiment of the present invention. A file is opened and a command to associate information with the file as described above is received, an indication of the association may be stored, and a command to view the information associated with the file is received 310 as described above. Tabbed windows or dialog boxes are displayed as described above 312, with a default selected tab of basic information. If the tab selected is basic information 314 (which it is after step 312), the method continues at step 316 and otherwise, the method continues at step 320.

At step 316, predefined tags and any values corresponding to those tags are displayed. One or more new values corresponding to the predefined tags, or one or more commands to delete a value such as by blanking it out using the backspace or delete keys, are received as described above, along with a indication to open and/or display the information associated with the file at the time the file is opened and all such information may be stored as described above 318. The method continues at step 336, where the user may supply an OK command or change tabs as described below.

At step 320, the information to be associated with the file is displayed as a list of all keys and values, with the first value highlighted and the highlighted key and value displayed in text boxes with which the user may use to change or delete the key or the value 320 as described herein and the method continues at step 336.

At step 336, a command is received, and if the command received in step 336 is an OK command 338, the method continues at step 340, and otherwise the method continues at step 324.

If the command is a command to move the cursor 324, a different key/value pair on the list corresponding to the cursor movement command is highlighted and the key and value pair highlighted are each displayed in a different text box as described above 326 or may be displayed in the same text box. The method continues at step 336.

If the command is a command to change the key or value or both in the text boxes 324, for example, because a user changed or deleted a key or value using the text box, the change is stored 328 as described above and the method continues at step 336.

If the command is a command to delete the highlighted key/value pair 324, the key/value pair is deleted from storage and the list updated to reflect the deletion 330 and a different key/value pair is highlighted and the highlighted key and value is displayed in the key and value text boxes as described above 332 and the method continues at step 336.

If the command is a command to add a key/value pair, a blank entry at the end of the list is highlighted and the key and/or value to be added is received either via either or both text boxes and displayed as a highlighted entry at the end of the list 334 and the method continues at step 336.

At step 340 another command may be received. If the command is a command to view information associated with the file 342, the method continues at step 312. If the command is a command to save the file 342, a file in a proprietary format, a file such as an HTML file corresponding to this file, or both may be saved 344 using the name of the file specified when the file was opened in step 310 (the corresponding file is saved with a different extension than the file). A shadow file name and path are generated from the file name and path as described above and a shadow file containing the information associated with the file is saved 346 in a tagged file format such as XML and the method continues at step 340.

If the command is a command to edit a graphical representation of the file or a code representation of the file such as an HTML or other type of file capable of being served to a browser 342, the graphical representation of the file and the code representation of the file are both changed to implement the edit specified in the command 348 and the method continues at step 340.

If the command in step 340 is a command to include associated files in uploads or downloads or to open information associated with the file when the file is opened, an indication to include associated information or open such associated information or both is stored with the file or file containing the associated information 352 and the method continues at step 340.

If the command in step 340 is a command to exit 342, the method terminates 350. In one embodiment, if such an exit command is received, the user may be warned to save the file, and if the user elects to save the file, the method continues from step 342 through steps 344 and 346 to step 350 as shown by the dashed line in the Figure.

Figure 3B:
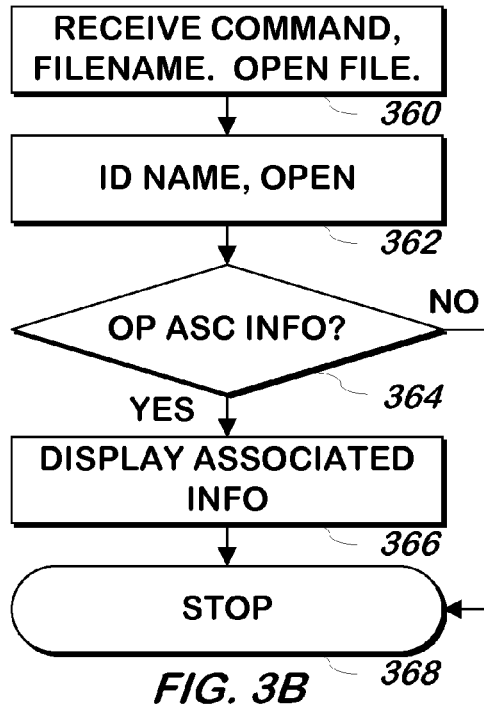
FIG. 3B is a flowchart illustrating a method of opening a file and optionally opening a file of information associated with the file according to one embodiment of the present invention.

Referring now to FIG. 3B, a method of opening a file and, optionally, displaying information associated with the file is shown according to one embodiment of the present invention.

A command to open a file, including the name of the file, is received 360. A filename of a file containing information associated as described above with the file specified in step 360 is identified 362 as described above. The file containing information associated with the file and identified in step 362 is opened 364. If such file containing information associated with the file contains an indication to open and display information associated with the file 366 and the associated information from the file opened in step 362 may be displayed 366 and the method terminates 368, otherwise 364, the file opened in step 362 may be optionally closed and the method terminates 368.

Termination of this method will not affect the performance of other steps which follow the method, for example receiving the command of step 310 of FIG. 3A. In another embodiment, step 368 is performed after the "no" branch of step 364 and step 367 is not used.

Figure 3E:
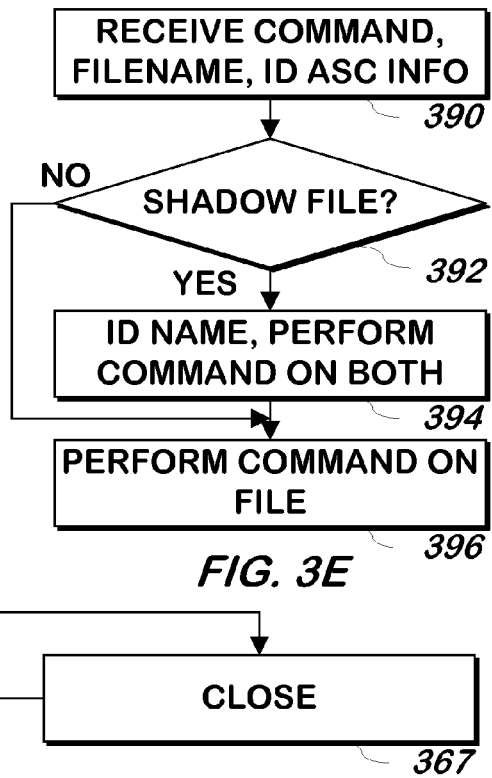
FIG. 3E is a flowchart illustrating a method of performing a command on a file and optionally, information associated with the file, is shown according to one embodiment of the present invention.
Figure 3C:
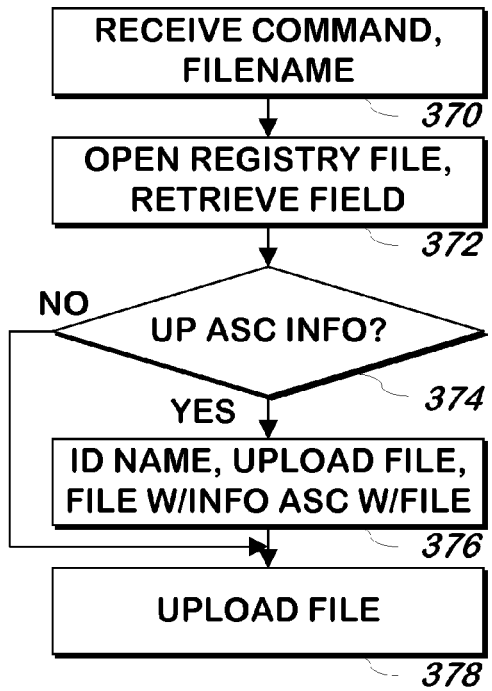
FIG. 3C is a flowchart illustrating a method of uploading a file and optionally uploading information associated with the file according to one embodiment of the present invention.

Referring now to FIG. 3C a method of uploading a file and information associated with the file is shown according to one embodiment of the present invention. A command to upload the file or a corresponding file related to the file or made using the file, such as an HTML file, including the name (which includes the path), is received 370. A registry file is opened and a field retrieved 372. If the field retrieved in step 372 indicates information associated with the file as described above is to be uploaded with the file or corresponding file 374, the filename of the information associated with the file is identified based on the file name of the file or corresponding file 376 as described above. The file and/or corresponding file, and the file containing information associated with the file, are uploaded 376. Otherwise, the file and/or corresponding file, is uploaded 378. In another embodiment, the field is stored as part of the file (or another file) corresponding to the filename received in step 370 instead of a registry file, and so that file is opened and the field is retrieved from that file in step 372 instead of the registry file.

Figure 3D:
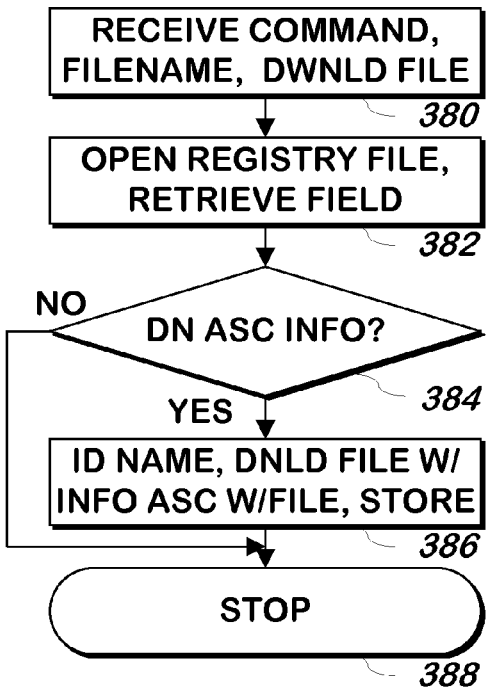
FIG. 3D is a flowchart illustrating a method of downloading a file and optionally uploading information associated with the file according to one embodiment of the present invention.

Referring now to FIG. 3D a method of downloading a file and information associated with the file is shown according to one embodiment of the present invention. A command to download the file, including the name (which includes the path), is received 380 and the file is downloaded. A registry file is opened and a field retrieved 382. If the field retrieved in step 382 indicates information associated with the file is to be downloaded with the file 384, the source and destination filename of the information associated with the file is identified from the name of the file or file to which the file corresponds 386 as described above. The file containing information associated with the file as described above is downloaded 386 using the filenames (including paths) for this file identified as described above and the method terminates 388. Otherwise 384, the method terminates 388. In another embodiment, the field is stored as part of the file (or another file) corresponding to the filename received in step 380 instead of a registry file, and so that file is opened and the field is retrieved from that file in step 382 instead of the registry file.

Referring now to FIG. 3E, a method of performing a command on a file and optionally, information associated with the file, is shown according to one embodiment of the present invention. A command such as delete or rename is received along with a filename including path, and the name and path of a shadow file containing information associated with the file as described above is identified as described above 390. If such a shadow file exists 392, the command is performed on both files and optionally one or more other files 394 and otherwise, the command is performed on the file and optionally one or more other files 396.

What is claimed is:

1. A computer-implemented method of associating information with a file, the method comprising:
   accessing a file;
   associating the accessed file with a web site;
   receiving input enabling an association of shadow information with the accessed file;
   presenting an interface for receiving the shadow information, wherein the interface includes key-value pairs;
   standardizing keys of the key-value pairs in accordance with a set of standard keys corresponding to the web site;
   receiving input defining the shadow information using one or more of the key-value pairs; and
   storing the defined shadow information in a shadow file associated with the accessed file.

2. The computer-implemented method of claim 1, wherein storing the defined shadow information in the shadow file further comprises:
   structuring the defined shadow information as one or more extensible mark-up language (XML) tag and attribute pairs.

3. The computer-implemented method of claim 1, wherein storing the defined shadow information in the shadow file further comprises:
   detecting a file name corresponding to the accessed file; and
   assigning a shadow file name based on the detected file name.

4. The computer-implemented method of claim 1, further comprising: receiving input defining a key corresponding to one of the key-value pairs.

5. The computer-implemented method of claim 1, further comprising: presenting selectable values corresponding to one of the key-value pairs; and
   receiving input selecting one of the selectable predefined values.

6. The computer-implemented method of claim 1, wherein presenting the interface further comprises:
   presenting a first tab corresponding to a first category of shadow information and a second tab corresponding to a second category of shadow information.

7. The computer-implemented method of claim 1, further comprising: deleting the shadow file in response to determining that the accessed file has been deleted.

8. A computer program product, encoded on a computer-readable medium, operable to cause data processing apparatus to perform operations comprising:
   accessing a file;
   associating the accessed file with a web site;
   receiving input enabling an association of shadow information with the accessed file;
   presenting an interface for receiving the shadow information, wherein the interface includes key-value pairs;
   standardizing keys of the key-value pairs in accordance with a set of standard keys corresponding to the web site;
   receiving input defining the shadow information using one or more of the key-value pairs; and
   storing the defined shadow information in a shadow file associated with the accessed file.

9. The computer program product of claim 8, further operable to cause data processing apparatus to perform operations comprising:
   structuring the defined shadow information as one or more extensible mark-up language (XML) tag and attribute pairs.

10. The computer program product of claim 8, further operable to cause data processing apparatus to perform operations comprising:
    detecting a file name corresponding to the accessed file; and
    assigning a shadow file name based on the detected file name.

11. The computer program product of claim 8, further operable to cause data processing apparatus to perform operations comprising:
    receiving input defining a key corresponding to one of the key-value pairs.

12. The computer program product of claim 8, further operable to cause data processing apparatus to perform operations comprising:
    presenting selectable values corresponding to one of the key-value pairs; and
    receiving input selecting one of the selectable predefined values.

13. The computer program product of claim 8, wherein operations comprising presenting the interface are further operable to cause data processing apparatus to perform operations comprising:
    presenting a first tab corresponding to a first category of shadow information and a second tab corresponding to a second category of shadow information.

14. The computer program product of claim 8, further operable to cause data processing apparatus to perform operations comprising:
    deleting the shadow file in response to determining that the accessed file has been deleted.

15. A system comprising:
    a storage device configured to store one or more files; and
    a computing system including a display device and processor electronics configured to perform operations comprising:
      accessing a file;
      associating the accessed file with a web site;
      receiving input enabling an association of shadow information with the accessed file;
      presenting an interface for receiving the shadow information, wherein the interface includes key-value pairs;
      standardizing keys of the key-value pairs in accordance with a set of standard keys corresponding to the web site;
      receiving input defining the shadow information using one or more of the key-value pairs; and
      storing the defined shadow information in a shadow file associated with the accessed file.

16. The system of claim 15, wherein the processor electronics configured to store the defined shadow information in the shadow file are further configured to perform operations comprising:
    structuring the defined shadow information as one or more extensible mark-up language (XML) tag and attribute pairs.

17. The system of claim 15, wherein the processor electronics configured to store the defined shadow information in the shadow file are further configured to perform operations comprising:
    detecting a file name corresponding to the accessed file; and
    assigning a shadow file name based on the detected file name.

18. The system of claim 15, wherein the processor electronics are further configured to perform operations comprising:
    receiving input defining a key corresponding to one of the key-value pairs.

19. The system of claim 15, wherein the processor electronics are further configured to perform operations comprising:
    presenting selectable values corresponding to one of the key-value pairs; and
    receiving input selecting one of the selectable predefined values.

20. The system of claim 15, wherein the processor electronics configured to present the interface for receiving the shadow information are further configured to perform operations comprising:
    presenting, on the display device, a first tab corresponding to a first category of shadow information and a second tab corresponding to a second category of shadow information.

21. The system of claim 15, wherein the processor electronics are further configured to perform operations comprising:
    deleting the shadow file in response to determining that the accessed file has been deleted.

* * * * *